June 28, 1949.  O. A. MONTGOMERY  2,474,752
FISHERMAN'S KIT
Filed Aug. 7, 1944  2 Sheets-Sheet 1
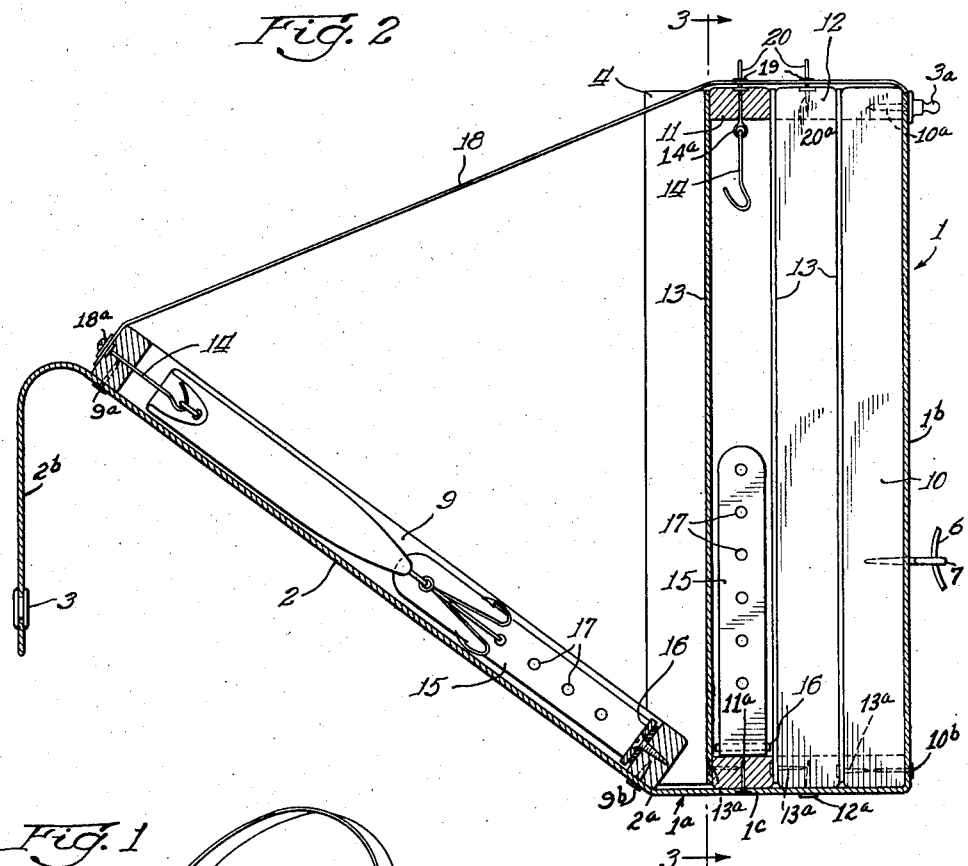
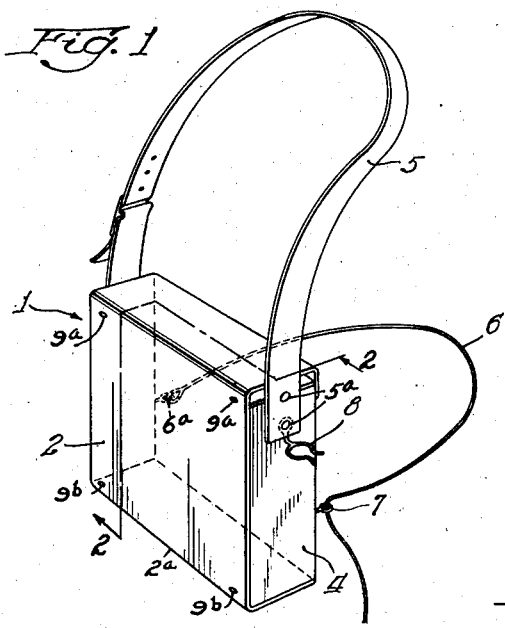
Inventor:
Ora A. Montgomery
By Langdon Moore
Atty.

June 28, 1949. O. A. MONTGOMERY 2,474,752
FISHERMAN'S KIT
Filed Aug. 7, 1944 2 Sheets-Sheet 2
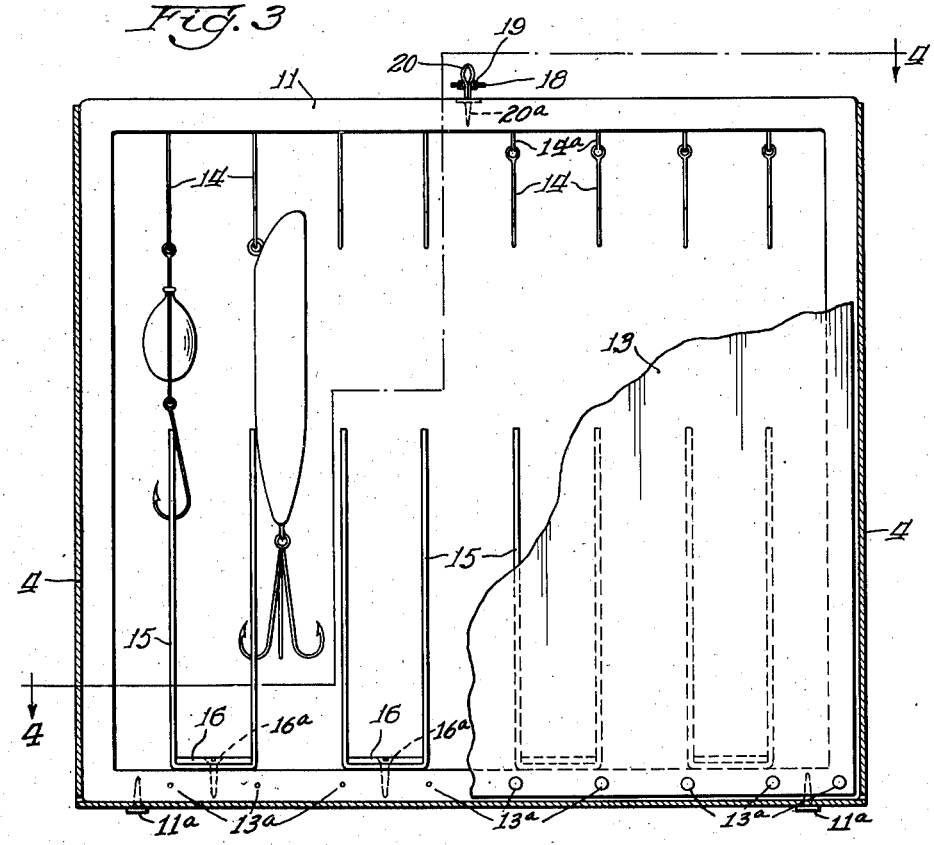
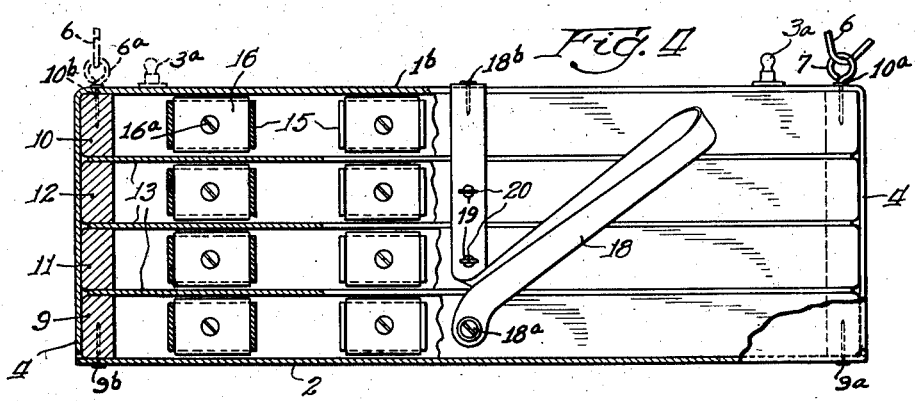
Inventor:
Ora A. Montgomery Patented June 28, 1949

2,474,752

UNITED STATES PATENT OFFICE 2,474,752

FISHERMAN'S KIT

Ora A. Montgomery, Miami, Okla.

Application August 7, 1944, Serial No. 548,428

5 Claims. (Cl. 43—31)

1

This invention relates to improvements in fishing paraphernalia, and more particularly, to a fisherman's kit.

It is an object of this invention to provide a fisherman's kit for the carrying of bait or plugs for casting which may be easily carried by the fisherman and make available to him the many different forms of plugs or bait for this form of casting. This bait is much more cumbersome than flies used for fly casting. In many instances, these plugs are a simulation of a small type of fish and are not easily carried; for instance, the hook cannot be attached to the fisherman's cap as in fly fishing. This invention contemplates the provision of a container or a rectangular satchel containing a plurality of hinged rectangular frames, each of sufficient thickness to enable the bait or plugs to be contained and supported within the frame.

With these and other objects in view, reference is made to the accompanying sheets of drawings which illustrate a form of this invention with the understanding that minor changes may be made without departing from the scope thereof.

In the drawings:

Figure 1 is a view in perspective of this improved fisherman's kit.

Figure 2 is a view partially in section and partly in elevation taken on the line 2—2 of Fig. 1, illustrating one frame of the kit in the open position.

Figure 3 is a view in section taken upon the line 3—3 of Figure 2 with parts broken away and parts illustrated in elevation.

Figure 4 is a view partly in top plan and partly in section taken upon the line 4—4 of Figure 3 looking in the direction of the arrows.

In the embodiment of this invention, the container or satchel 1 is preferably provided with a one piece cover member 1a enclosing a plurality of hollow rectangular frame members 9, 10, 11 and 12. The cover member 1a includes a front cover portion 2 formed by drawing the cover member 1a up over the lower edge of the frame member 9 and securing it along the upper edge of said frame member by means of tacks 9a and along the lower edge of said frame member by tacks 9b, which provides a flexible connection along the line 2a adjacent the forward portion of the lower edge of the frame member 9 for a purpose to be brought out fully hereinafter. The front cover portion 2 has a laterally extending portion 2b provided with a pair of eyelets 3 adjacent the corner portions thereof, which extends over the top and is fastened by the cooperation of the eyelets 3 with lug

2 portions 3a secured to the upper edge of the frame member 10. The cover member 1a also includes end cover portions 4 which are preferably provided with a strap 5, the opposite ends of which may be secured to the ends 4 by means of rivets 5a, to pass about the fisherman's neck and may be made adjustable so as to support the container in the front of the body in the most convenient spot, usually just above the belt. The rear cover portion 1b of the container is formed by drawing the cover member 1a up over the lower edge of the frame member 10 and securing its upper edge to the upper edge of the frame member 10 by means of tacks 10a. To furnish added strength the lower portion of the rear cover member 1b may be secured to the lower edge of the frame member 10 by tacks 10b. To yield even further stability to the assembly, the bottom cover portion 1c may be secured to the lower edges of the intermediate frame members 11 and 12 by means of tacks 11a and 12a.

The rearward portion of the container 1 is preferably provided with a strap or cord 6 attached at one end thereof to a screw eye 6a disposed adjacent one corner of said container, said strap being adapted to pass through a second screw eye 7 to provide a sliding and adjustable connection at the other corner to secure the container in place upon the fisherman's body. One of the end cover portions 4 of the container is preferably provided with a spring snap 8, which may be secured thereto by one of the same rivets 5a used to secure the strap 5 to said end cover portion, for holding the rod when it is desired to change the plug or bait.

The container is preferably made of canvas or other waterproof material. The frames 9, 11, 12 and 10 enclosed by the cover member 1a are of sufficient thickness to support within them the largest form of bait or plug. It is preferable to provide leather or other flexible partitions 13 secured at the lower edges thereof by means of tacks 13a to the frames 11, 12, and 10 at their lower, forward edges to separate the bait carried on the respective frames and prevent their engagement with each other. The partitions 13 are not otherwise secured in any manner to the frames 11, 12 and 10.

Each frame is provided along its top with a plurality of depending hooked supports 14 secured to screw eyes 14a for engagement with the loop or snood of the bait and with a plurality of similarly located resilient members 15 upon the bottom of the frame for engagement with the hook of the bait. These resilient members are preferably in the form of strips of elastic or rubber spaced apart a distance corresponding to the supports 14 upon the upper portion of the frame and are preferably secured by spacing members 16 attached by screws 16a to the bottom of the frame, as shown in Figures 3 and 4. It is preferable that each one of these members 15 be provided with a plurality of similarly spaced apart apertures 17 for ready engagement with the hook of the bait to maintain the bait in engagement with the support 14. The resilient members 15 will normally be in a collapsed or flexed position because of their own weight when not in use, but for purposes of illustration they have been shown in their extended position in Figures 2 and 3.

As seen in Figure 2, when the extension 2b of the front cover portion 2 is disengaged from the lugs 3a and opened, the frame member 9 will be supported at an angle to the container by the strap 18. This strap 18 is preferably applied centrally of the container 1 and may be secured to the upper edge of the frame member 9 by means of a screw 18a and to the inner frame 10 by means of a tack 18b as shown in Fig. 4. It is preferable to provide this strap with spaced apart eyelets 19 to detachably secure the same to studs 20 forming part of conventional snap fasteners and which may be secured so as to extend upwardly from the top of the intermediate frames 11 and 12 by means of a depending threaded portion 20a to normally maintain the frames in upright position, as shown in Figure 2. When the container 1 is closed by attaching the eyelets 3 to the lugs 3a the strap 18 will be folded back upon itself and lie across the upper edges of the frame members 9, 11, 12 and 10 as is clearly shown in Figure 4.

As heretofore said, in plug or bait casting, many different types of bait must be carried by the fisherman to meet various conditions encountered in catching various types of fish, so that the fisherman employing this kit, by disengaging the extending portion 2b of the front cover 2, which allows the frame member 9 to pivot outwardly, may readily obtain the bait desired, if it is carried in the front frame 9. If not, he may readily disengage the next frame 11 from the strap 18 by merely lifting the strap 18, thus causing the eyelet 19 to pass up over the expanded flexible head portion of stud 20 of the conventional snap fastener, and fold frame 11 outwardly against the front frame exposing another row of bait. If the proper bait is not contained in this frame, he may readily disengage the next following frame 12 and fold it outwardly exposing the bait contained thereon. And if not found there fold back the partition 13 which as heretofore set forth is of flexible material and secured only along the lower edge thereof, uncovering the last frame 10 for inspecting the bait contained therein. When the proper bait has been determined, it is readily disengaged from the eyelet 17 of the resilient member 15. In the meantime, if the fisherman does not desire to let his rod lie on the ground or against a tree, he may support it in the clasp 8 upon the side of the container 1.

The advantages of this invention are readily appreciated by any fisherman who desires to engage in plug or bait casting. It not only carries a great number of various types of bait but provides means for readily removing the proper bait from the kit. The bait is protected from engagement with each other by being supported in spaced apart relation in each frame and by the flexible partitions 13 separating each frame from the other.

What I claim is:

1. A fisherman's kit, comprising: a one piece cover member including top, bottom, front, rear and a pair of side portions, said top portion being a continuation of said front portion; fastening means detachably securing said top portion to said rear portion; a plurality of hollow frame members within said cover member, each of said frame members including means to support a plurality of baits under tension therein, one of said frame members being attached to said rear portion, another of said frame members being attached to said front portion and the intermediate frame members being attached at the lower ends thereof to said bottom portion, the arrangement being such that said second-mentioned frame member is permitted outward pivotal movement with respect to said first-mentioned frame member when said top portion is detached from said rear portion; a strap member secured to the upper edges of said first and second-mentioned frame members to limit the outward pivotal movement of said second-mentioned frame member with respect to said first-mentioned frame member; a stud member extending upwardly from the upper edges of each of said intermediate frame members, said stud member cooperating with spaced apertures in said strap member so as to detachably maintain said intermediate frame members in substantially parallel relationship with said first-mentioned frame member; and a flexible partition between adjacent frame members secured at its lower edge to the lower edge of one of said frame members.

2. A fisherman's kit, comprising: a cover member; front, intermediate and rear frame members within said cover member, each of said frame members including means for supporting a plurality of baits therein; means rigidly securing said rear frame member with respect to said cover member; means mounting said front and intermediate frame members for outward pivotal movement with respect to said rear frame member; and means secured to said front and rear frame members limiting the outward pivotal movement of said front frame member with respect to said rear frame member, said last-named means also serving to detachably maintain said intermediate frame member in substantially parallel relationship with said rear frame member.

3. A fisherman's kit, comprising: a cover member; frame members within said cover member including front, rear and at least one intermediate frame member, each of said frame members including means for supporting a plurality of baits therein; means securing said rear frame member rigidly to said cover member; means securing said front member and intermediate frame member to said cover member for pivotal outward movement with respect to said rear frame member; strap means secured to the upper edges of said front and rear frame members for limiting the outward pivotal movement of said front frame member with respect to said rear frame member; and means carried by said intermediate frame member cooperating with said strap means for detachably maintaining said intermediate frame member in substantially parallel relationship with said rear frame member.

4. A fisherman's kit, comprising: a cover member; frame members within said cover member including front, rear and at least one intermediate frame member, each of said frame members including means for supporting a plurality of baits therein; means securing said rear frame member rigidly to said cover member; means securing said front frame member and intermediate frame member to said cover member for pivotal outward movement with respect to said rear frame member; strap means secured to the upper edges of said front and rear frame members for limiting the outward pivotal movement of said front frame member with respect to said rear frame member; and a stud member extending upwardly from the upper edge of said intermediate frame member, said stud member cooperating with an aperture in said strap means spaced from the end of said strap means that is secured to said upper edge of said rear frame member for detachably maintaining said intermediate frame member in substantially parallel relationship with said rear frame member.

5. A fisherman's kit, comprising: a cover member; front, intermediate and rear frame members within said cover member, each of said frame members including means for supporting a plurality of baits therein; means rigidly securing said rear frame member with respect to said cover member; means mounting said front and intermediate frame members for outward pivotal movement with respect to said rear frame member; means secured to said front and rear frame members limiting the outward pivotal movement of said front frame member with respect to said rear frame member, said last-named means also serving to detachably maintain said intermediate frame member in substantially parallel relationship with said rear frame member; and flexible partitions separating adjacent frame members, the lower edge of each of said partitions being secured to the lower edge of its adjacent frame member.

ORA A. MONTGOMERY.

REFERENCES CITED

The following references are of record in the file of this patent:

UNITED STATES PATENTS

| Number | Name | Date |
|---|---|---|
| 99,736 | Wiler | Feb. 8, 1870 |
| 197,935 | Holt | Dec. 11, 1877 |
| 891,612 | Ericson | June 23, 1908 |
| 940,132 | Creasey | Nov. 16, 1909 |
| 1,094,207 | Hollingsworth | Apr. 21, 1914 |
| 1,110,150 | Slavin et al. | Sept. 8, 1914 |
| 1,261,861 | Sherman | Apr. 9, 1918 |
| 1,736,337 | Borel | Nov. 19, 1929 |
| 1,954,127 | Harsted | Apr. 10, 1934 |
| 2,130,112 | Woolen | Sept. 13, 1938 |
| 2,153,549 | Cooper | Apr. 11, 1939 |
| 2,171,676 | Wallace | Sept. 5, 1939 |
| 2,220,817 | Holmes | Nov. 5, 1940 |
| 2,388,811 | Zatko | Nov. 13, 1945 |

FOREIGN PATENTS

| Number | Country | Date |
|---|---|---|
| 222,296 | Great Britain | Oct. 2, 1924 |